United States Patent

Horlitz, Jr.

[11] 3,913,330
[45] Oct. 21, 1975

[54] VAPOR GENERATOR HEAT RECOVERY SYSTEM
[75] Inventor: Carl Frederick Horlitz, Jr., Bloomfield, Conn.
[73] Assignee: Combustion Engineering, Inc., Windsor, Conn.
[22] Filed: June 17, 1974
[21] Appl. No.: 479,712

[52] U.S. Cl. .............................. 60/678; 122/DIG. 2
[51] Int. Cl.² ........................................... F01K 7/34
[58] Field of Search ................... 60/670, 678, 679; 122/DIG. 2

[56] References Cited
UNITED STATES PATENTS
3,016,712 1/1962 Taylor .............................. 60/679 X
3,579,990 5/1971 Grams .............................. 60/679 X FOREIGN PATENTS OR APPLICATIONS
102,146 8/1962 Netherlands ........................ 60/678
1,026,190 4/1953 France ............................... 60/678

Primary Examiner—Martin P. Schwadron
Assistant Examiner—H. Burks, Sr.

[57] ABSTRACT

A vapor generator heat recovery system is described for use in high efficiency power plants, especially of the marine type, having multiple stages of high pressure regenerative feedwater heating. The vapor generator is provided with a sectionalized economizer in which one section is disposed upstream of a tubular air heater in the feedwater flow sense whereby air preheating is accomplished by heat passed from the feedwater heated in the section. The system arrangement is such that total feedwater flow is utilized in the air heater thereby reducing the amount of heat transfer surface required therein. Controls are provided to ensure that all of the heat acquired by the feedwater in the one economizer section is transferred to the incoming combustion air in order that the feedwater entering the high pressure feed heaters is such as to produce increased thermal efficiencies that are available through the use of the high pressure feedwater heaters.

7 Claims, 1 Drawing Figure

VAPOR GENERATOR HEAT RECOVERY SYSTEM

BACKGROUND OF THE INVENTION

The invention relates to power plant systems and, more particularly, to a heat recovery system for vapor generators utilized in marine power plants.

The thermal efficiency of any power plant heat recovery system is affected by the temperature of the feedwater entering the flow circuit of the vapor generator and by the temperature of the combustion gases discharged therefrom. Such thermal efficiencies are increased directly in response to entering feedwater temperatures and inversely in response to combustion gas exit temperatures.

In marine power plant applications two types of heat recovery systems have received popular consideration. The first, known as an "economizer-steam air heater" cycle, contains a turbine couple comprising a high pressure turbine and a low pressure turbine for driving the propulsion apparatus. Fluid for air and feedwater preheating purposes is extracted from the crossover line between the two turbines and from low pressure turbine extraction points. No fluid is extracted from the high pressure turbine. The feedwater delivered to the economizer, in a conventional system of this type, is heated to approximately 280°F while the combustion air is heated to about 250°F. Exhaust gas heat recovery is effected in the economizer which cools the gas leaving the unit to a temperature of about 320°F while the feedwater passed to the vapor generator flow circuit is heated to about 400°F.

The second type of marine heat recovery system is known as a "regenerative air heater" cycle. It is similar to the aforementioned "economizer-steam air heater" cycle but contains two high pressure fluid extractions in addition to those from the crossover line and the low pressure turbine. The temperature of the feedwater delivered to the economizer can thus be increased to about 420°F. Exhaust gas heat recovery is effected in the economizer where the gas is cooled to about 600°F and the feedwater heated to approximately 450°F. The exhaust gas in these systems is further cooled in a regenerative air heater, either of the rotary plate type or tubular, to about 240°F in heating the entering combustion air to about 500°F.

It can thus be appreciated that the regenerative air heater cycle delivers greater thermal efficiencies than the economizer steam air heater cycle. In fact, the latter cycle delivers thermal efficiencies typically about 7 percent greater than the former. Such systems, however, have not been totally accepted in marine power plant applications primarily due to a reluctance to utilize a regenerative air heater on shipboard. Such reluctance is due primarily to the higher initial costs, greater maintenance costs associated with such equipment and also to their susceptibility to breakdown caused by fouling. Thus, marine plants have been constrained to utilize the "economizer-steam air heater" cycle, with its attendant reduced thermal efficiencies.

A partial solution to the instant problem is disclosed in U.S. Pat. No. 2,762,345 issued Sept. 11, 1956 to J. H. Bayard. This patent describes a power plant heat recovery system including a vapor generator in which the economizer is divided into plural sections. Liquid is removed from the feedwater preheating train downstream of the final feedwater heater and thereafter heated in one section of the economizer. This feedwater is then passed in indirect heat exchange relation with the incoming combustion air in order to preheat the same. Following this, the feedwater is reheated in another section of the economizer prior to being passed to the boiler circuit. This disclosed system is deficient in that, due to the resulting temperatures in various stages of the system, only a fractional part of the total feedwater flow can be utilized for air heating purposes. Therefore, a greater amount of tubular heating surface is required in the air heater in order to heat the incoming combustion air up to the desired temperature. This, of course, adds significantly to the equipment costs of the system.

It is to this problem, therefore, that the present invention is directed.

SUMMARY OF THE INVENTION

According to the present invention there is provided a power plant system of the described type in which the economies derived from air and feedwater preheating are obtained without the need for a rotary regenerative air heater or excessive, costly tubular heating surface. The power plant system includes a turbine arrangement comprising a high pressure turbine and a low pressure turbine; a vapor generator having a flow circuit operatively connected for supplying motive fluid to the turbine, the vapor generator including a furnace having fuel burners operatively disposed therein and an exhaust gas outlet therefrom. An economizer having plural sections is disposed in heat transfer relation with combustion gases flowing through the exhaust gas outlet. The feedwater supply to the vapor generator includes means for preheating the feedwater by extraction fluid from the turbine arrangement and a tubular air heater is provided for preheating combustion air supplied to the burners. A feedwater train is also provided in which the feedwater is passed in series through one of the economizer sections, the air heater, the feedwater preheater and thence through another of the economizer sections before entering the vapor generator flow circuit.

The described heat recovery system is such that feedwater, after passing through the feedwater heaters receiving heat from the extraction fluid from the low pressure turbine, is discharged into one of the economizer sections, preferably that being heated by lower temperature combustion gases, whereby the water temperature is raised a predetermined amount. The feedwater is then passed to the air heater where it is cooled by the incoming combustion air thus preheating the latter and reducing the water temperature preferably back to that possessed by the feedwater prior to its entering the economizer section. The feedwater then enters the feedwater heaters associated with the high pressure turbine followed by the higher temperature economizer section before it is admitted to the vapor generator boiler drum for circulation through the vapor generator fluid circuit.

A principle object of the described arrangement, therefore, is to provide a heat recovery system capable of achieving the greater thermal efficiencies possible from use of high pressure feed heaters yet with greater reliability than similar systems of the prior art.

A further object of the invention is to provide a heat recovery system of the described type for use in a power plant containing high pressure feed heaters but without the need for rotary regenerative air heaters.

For a better understanding of the invention, its operating advantages and the specific objects obtained by its use, reference should be made to the accompanying drawing and description which relate to a preferred embodiment of the invention.

BRIEF DESCRIPTION OF THE DRAWING

The single drawing FIGURE depicts a schematic flow diagram of a marine power plant utilizing the heat recovery system of the present invention.

DESCRIPTION OF THE PREFERRED EMBODIMENT

Figure 1:
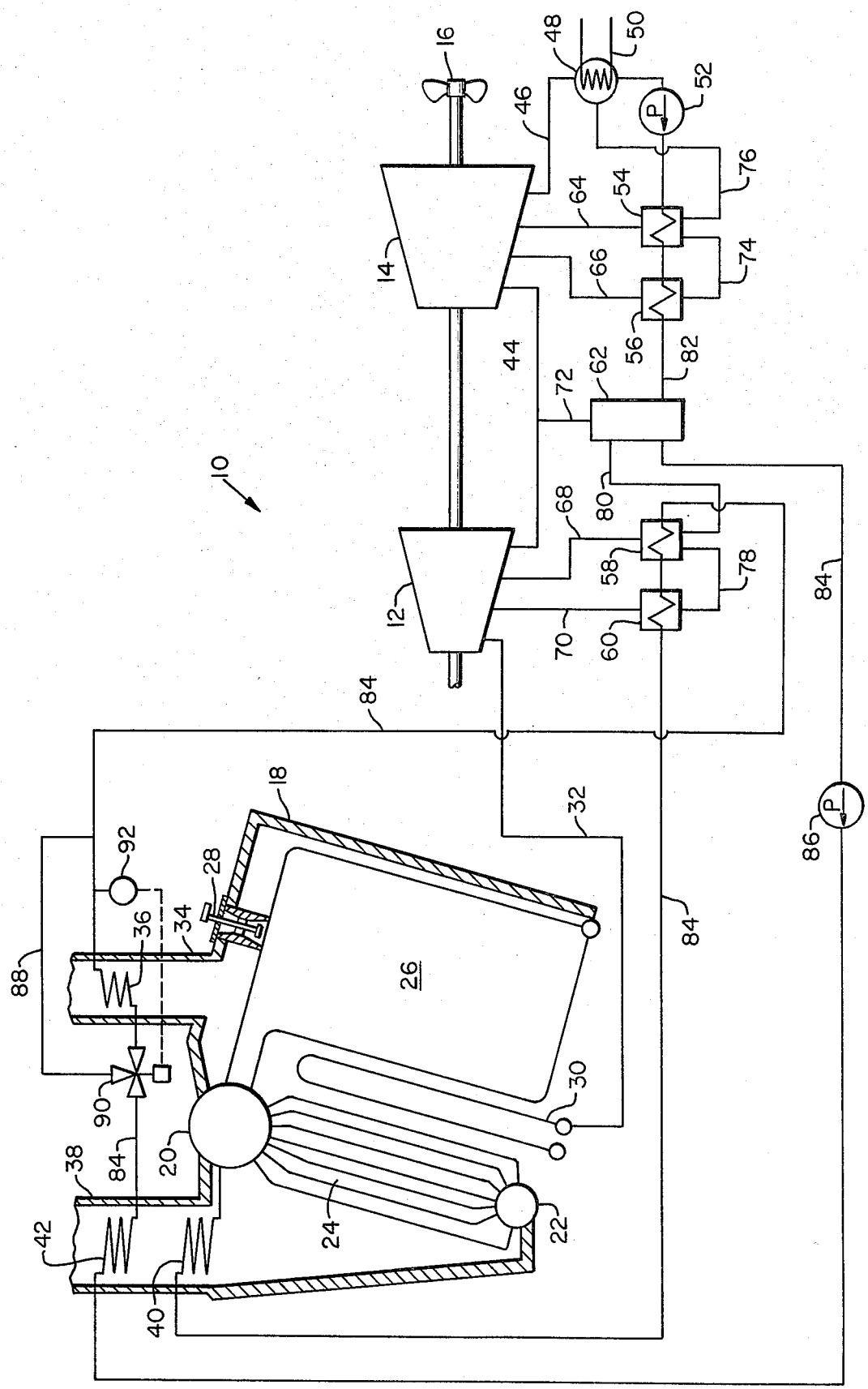

Referring now to the drawing, there is illustrated a power plant 10 including a turbine couple comprising high pressure turbine 12 and low pressure turbine 14, here shown as being utilized for driving marine propulsion apparatus, indicated as 16. Motive fluid, in the form of superheated vapor, is provided the turbine couple by a vapor generator 18 which consists generally of upper and lower drums 20 and 22 respectively, interconnected by a bank of boiler tubes 24. Rectangularly disposed tubulous walls define a furnace chamber 26 within the vapor generator in which one or more fuel burners 28 are operatively disposed. A superheater 30 is located within the furnace chamber 26 to heat saturated vapor received from the upper drum 20. This superheated vapor is passed through steam main 32 to the inlet of the high pressure turbine 12.

Air for combustion of the fuel discharged from burners 28 is supplied by an air duct 34 containing a tubular heat exchanger, termed the air heater 36, that operates to preheat incoming combustion air in a manner described hereinafter. The gaseous products of combustion generated in the furnace chamber 26 are discharged from the unit through exhaust gas outlet duct 38 which communicates with a stack (not shown). Tubulous economizer heating surface having plural sections indicated as the primary economizer section 40 and secondary economizer section 42 is disposed in the exhaust gas outlet duct 38. As shown, the primary economizer section 40 is disposed upstream, in the combustion gas flow sense, from the secondary economizer section 42. Feedwater that is ultimately supplied to the vapor generator flow circuit is passed through the tubes of these economizer sections in heat exchange relation with the exhaust gases therein whereby the temperature of the feedwater is raised while the exhaust gas temperature is reduced thus improving the thermal efficiency of the system.

Superheated vapor discharged from the high pressure turbine 12 is passed by means of the crossover line 44 to the inlet of the low pressure turbine 14 from whence it is exhausted through line 46 to condenser 48. Cooling water passes through the condenser 48 in a bank of cooling tubes indicated as 50 to condense the exhausted vapor. Liquid condensate collected in the condenser 48 is removed therefrom by condensate pump 52 which serves to recirculate the same through the system as feedwater for the vapor generator.

The heat recovery system of the power plant includes a feedwater train comprising a number of feedwater heaters, 54, 56, 58, 60 and 62, in which extraction fluid from the respective turbine serves to raise the temperature of the feedwater conducted therethrough. As shown, heaters 54 and 56 receive extraction fluid from the low pressure turbine 14 through lines 64 and 66 respectively. Heaters 58 and 60 receive their extraction fluid from the high pressure turbine 12 through line 68 and 70 respectively, and heater 62, which is a direct contact heat exchanger employed for de-aerating purposes receives extraction fluid through line 72 from the crossover line 44. Liquid condensed in the heaters 54 and 56 is returned to the condenser 48 through lines 74 and 76. That condensed in the heaters 58 and 60, on the other hand, is passed to the de-aerating heater 62 through lines 78 and 80. The feedwater train further includes those heat exchangers represented by the air heater 36 and primary and secondary economizer sections, 40 and 42 respectively, through which feedwater is conducted prior to its discharge into the vapor generator flow circuit as hereinafter described.

According to the present invention, feedwater from the condenser 48 is passed by condensate pump 52 through line 82 to the de-aerating feed heater 26. In flowing to the de-aerating heater 62 the feedwater is initially heated by extraction fluid from the low pressure turbine 14 in the feed heaters 54 and 56. From the heater 62 line 84 containing feed pump 86 circulates the feedwater serially through the secondary economizer section 42, the air heater 36, feed heaters 58 and 60 and thence through the primary economizer section 40 before finally discharging the liquid into the vapor generator drum 20. In flowing through the secondary economizer section 42 the feedwater extracts heat from the combustion gases exiting the vapor generator through exhaust gas outlet duct 38. The feedwater next traverses the tubes comprising the air heater 36 where the heat contained therein is transferred to the cold incoming combustion air passing trhrough air duct 34 thereby heating the air to a predetermined temperature. The feedwater, whose temperature is reduced in the air heater 36, is heated again as it next passes serially through the feed heaters 58 and 60 which receive heating medium in the form of extraction fluid from the high pressure turbine 12. Thereafter, line 84 conducts the feedwater through the primary ecnomizer section 40 where heat is applied to the feedwater in order to raise its temperature to its final degree prior to passage of the feedwater into the boiler drum 20.

Although the amount of heat transfer surface contained in the air heater 36 is preferably selected to automatically transfer all of the heat imparted to fluid flowing through the secondary economizer section 42 during normal operating conditions of the power plant, means such as an air heater bypass line 88 and flow regulating valve 90 is shown in the drawing, may be provided to control the flow of feedwater through the air heater 36 so as to effect the desired heat transfer during periods of operation other than normal design operating conditions. Such apparatus may be useful in a marine power plant, for example, during periods of maneuvering of the vessel. In the illustrated arrangement the valve 90 is operated in response to feedwater temperature sensed at the outlet of the air heater 36 by temperature sensor 92. The feedwater flow through the air heater 36 is controlled such that substantially all of the heat transferred to the feedwater from the combustion gas in the secondary economizer section 42 is passed to the incoming combustion air flowing through the duct 34. In this way the temperature of the feedwater leaving the air heater 36 is maintained substantially the same as that discharged from the de-aerating heater 62.

In a typical marine power plant application of the described invention, where the temperature of the feedwater exiting the de-aerating feed heater 62 is 285°F and the inlet temperature of the combustion gases entering the exhaust gas outlet duct 38 is 804°F, the feedwater is heated to 337°F in the secondary economizer section 42 and, in turn, heats combustion air incoming at 100°F to a temperature of 308°F, while being cooled to 284°F prior to entering the high pressure feed heaters 58 and 60. The feedwater exits the final feed heater 60 at 423°F and is heated to 497°F in the primary economizer section 40 before entering the vapor generator drum 20. Combustion gases which are the heating medium for the economizer sections in the duct 38 is cooled to an outlet temperature of 310°F.

It will thus be appreciated that, by means of the described heat recovery system, greater thermal efficiencies can be achieved as compared with those obtained by a conventional "economizer-steam air heater" cycle. By means of the described system regulation of heat transfer in both the secondary economizer section 42 and the air heater 36 can be effected in such a manner that the feedwater can be effectively heated in the feed heaters 58 and 60 by fluid extracted from the high pressure turbine 12. Because the feedwater utilized in the air heater 36 can be passed to the high pressure feed heaters 58 and 60 at about the same temperature as the feedwater leaving the de-aerating feed heater 62, these heaters remain operative at their normal cycle design temperatures. Moreover, the efficiencies obtained from the described heat recovery system, which approach those obtained from a typical "regenerative air heater" cycle, do not require the use of a rotary plate type or tubular regenerative air heater and, thereby avoid the cost, and potential maintenance problems, attendant therewith. Still further, because the system permits flow of all feedwater through the air heater for preheating purposes this apparatus can adequately heat incoming combustion air using less heating surface than is required by a system such as that disclosed in U.S. Pat. No. 2,762,345. This results, of course, in significant savings in equipment costs.

It will be understood, therefore, that variations, changes in the details, materials, and arrangements of the parts which have been described and illustrated in order to explain the nature of the invention may be made by those skilled in the art within the principles and scope of the invention. What is sought to be protected herein is as recited in the appended claims.

What is claimed is:
1. A power plant system including, in combination:
a. turbine means;
b. a vapor generator having a flow circuit operatively connected for supplying motive fluid to said turbine means, said vapor generator having:
   i. a furnace,
   ii. fuel burning means operatively disposed in said furnace, and
   iii. an exhaust gas outlet from said furnace;
c. an economizer having plural sections in heat transfer relation with combustion gases flowing through said exhaust gas outlet;
d. means for supplying feedwater to said vapor generator;
e. preheater means for preheating said feedwater by extraction fluid from said turbine means;
f. means for supplying combustion air to said fuel burning means;
g. a tubular air heater for preheating said combustion air; and
h. a feedwater train including means for passing feedwater seriatim through one of said economizer sections, said air heater, said feedwater preheater, another of said economizer sections and said vapor generator flow circuit.

2. The combination as recited in claim 1 in which said economizer contains two sections series connected in the gas flow sense in the flow path of said combustion gases and in which the outlet of the downstream section of said economizer connects with the inlet of said air heater.

3. The combination as recited in claim 1 in which said turbine means includes a high pressure turbine and a low pressure turbine and said feedwater preheater employs extraction fluid from said high pressure turbine.

4. The combination as recited in claim 3 in which said high pressure turbine and said low pressure turbine each supply extraction fluid to their respective feedwater preheaters and the outlet of said low pressure turbine feedwater preheater communicates with the inlet of said one economizer section.

5. The combination as recited in claim 2 in which said turbine means includes a high pressure turbine and a low pressure turbine, each supplying extraction fluid to their respective feedwater preheaters, and the outlet of said low pressure turbine feedwater preheater communicates with the inlet of said downstream section of said economizer.

6. The combination as recited in claim 5 including means for regulating the flow of feedwater through said air heater in response to the feedwater temperature at the outlet thereof.

7. The combination as recited in claim 6 in which said flow regulating means operates to maintain the feedwater temperature at said air heater outlet substantially the same as the temperature of said feedwater at the inlet of said downstream section of said economizer.

* * * * *